Dec. 10, 1968  N. B. KLEVELAND  3,415,426
DISPENSING VALVE
Filed May 16, 1966
5 Sheets-Sheet 1
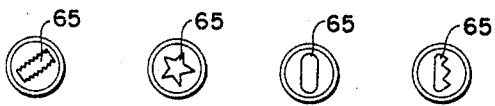
Fig. 3
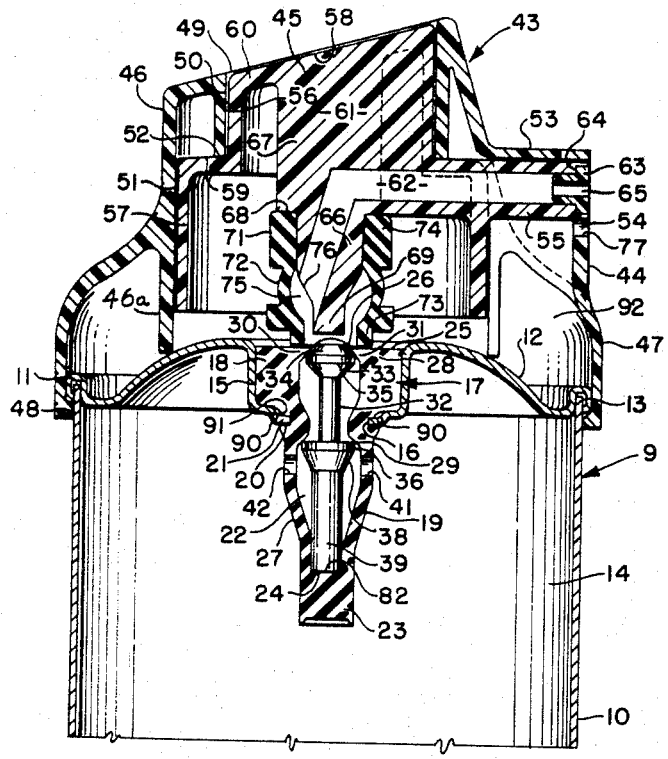
Fig. 1
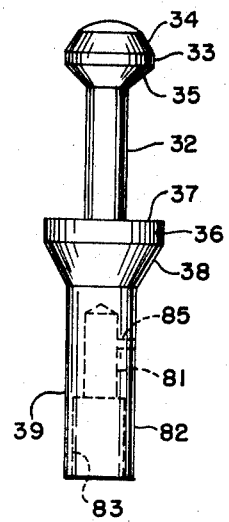
Fig. 2
INVENTOR
NELS B. KLEVELAND
BY 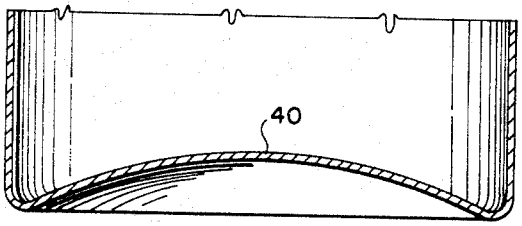
ATTORNEYS Dec. 10, 1968

N. B. KLEVELAND 3,415,426

DISPENSING VALVE

Filed May 16, 1966

INVENTOR
NELS B. KLEVELAND

BY

ATTORNEYS

Dec. 10, 1968 N. B. KLEVELAND 3,415,426
DISPENSING VALVE

Filed May 16, 1966 5 Sheets-Sheet 3

INVENTOR
NELS B. KLEVELAND

BY *Kramer & Stinger*

ATTORNEYS

Dec. 10, 1968  N. B. KLEVELAND  3,415,426
DISPENSING VALVE
Filed May 16, 1966  5 Sheets-Sheet 4

INVENTOR
NELS B. KLEVELAND

BY *Kramer & Sturges*

ATTORNEYS

United States Patent Office 3,415,426
Patented Dec. 10, 1968

3,415,426
DISPENSING VALVE
Nels B. Kleveland, East Cleveland, Ohio, assignor to Eaton Yale & Towne Inc., Cleveland, Ohio, a corporation of Ohio
Filed May 16, 1966, Ser. No. 550,392
14 Claims. (Cl. 222—402.11)

ABSTRACT OF THE DISCLOSURE

A pressurized container having an opening in which is mounted a resilient housing for a valve. The valve housing includes an outlet, a valve for sealing the outlet, and a moveable nozzle for operating the valve. The nozzle and outlet of the valve housing are in spaced relation during operation of the valve. A resilient hollow sleeve is provided in surrounding sealing relation with the outlet and nozzle for directing material, under pressure, from the container into the nozzle when the valve is operated.

---

This invention is directed to providing a simple valving mechanism for the effective metering or dispensing of materials under pressure from a container. More particularly, this invention is characterized in that residual material at the exit of the pressurized vessel is kept at a minimum, a feature of particular importance in the dispensing of perishable foods from such containers. The structures of the present invention keep to a minimum areas where foodstuffs may collect and spoil, and facilitate cleaning of any exudate or residue in or around any of the parts by easy removal and disassembly of the dispensing valve.

Briefly stated, the invention is in a mechanism for dispensing material under pressure from a container having a material storage tank or vessel with an opening in one end. In accordance herewith, there is provided a pliable or resilient valve housing which is insertable in the opening of the storage vessel. The valve housing has a chamber with a valved opening leading therefrom. Port means are provided for allowing material under pressure to pass from the storage vessel into the chamber. A valve seat is formed in the opening of the chamber, and an externally accessible valve stem is mounted in the chamber and carries a valve which is biased against the valve seat to keep material under pressure from flowing out of the chamber. The container is provided with a nozzle, which is preferably removable, for carrying dispensed material away from the chamber. The nozzle is designed such that a portion of the nozzle including an actuator engages the valve stem externally of the container itself to unseat the valve when the actuator is depressed. A resilient member surrounding the nozzle portion that engages the valve stem, provides a seal between the nozzle assembly and valve housing, and means for directing material from the chamber into the nozzle passageway. The resilient member also acts to bias the nozzle away from the valve stem.

Basically, the valve structure provides for its adaptability to dispensing materials of a variety of consistencies, e.g. liquids, dispersions, emulsions, and semi-solids, and the like. The housing for the valve may be readily modified to accommodate such materials, e.g. the dispensing of a liquid under the influence of a pressurized propellant in one case, and in another embodiment, a combination of propellant and the material in a spray form.

The following description of the invention will be better understood by having reference to the annexed drawing, wherein:

FIG. 1 is a cross-sectional view of a pressurized container, showing one embodiment of the invention for controlling the flow of pressurized material from the container;

FIG. 2 is an enlarged side view of the valve stem and valve useful in conjunction with the embodiment of the invention shown in FIG. 4;

FIG. 3 are end views or differently configured inserts for the nozzle of the container shown in FIG. 1;

Figure 4:
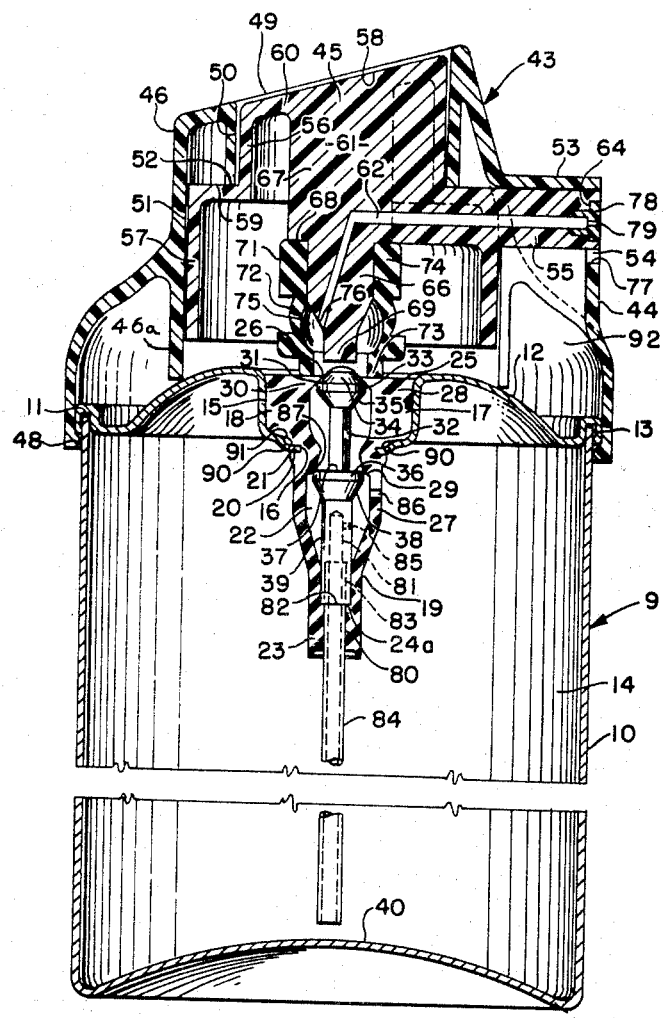
FIG. 4 is a cross-sectional view of a pressurized container showing another embodiment of the invention for controlling the flow of pressurized material from the container.

Referring generally to FIGS 1–4, 6 and 7, and more particularly to FIG. 1 of the annexed drawing, there is shown a pressurizable container of the so-called "aerosol" type, generally indicated at 9. The container 9 comprises a cylindrical body portion 10 having an open end 11. A closure cap 12 for sealing the open container end 11, is clamped or locked to the body portion 10 by any suitable means, e.g. conventional rolling means to form a chime 13. The closure cap 12 and cylinder body 10 are, preferably, made of metal, and form a vessel 14 where material under pressure is contained.

The closure cap 12 has a centrally disposed well 15 extending into the storage vessel 14. The well 15 has an opening 16 leading into the storage vessel 14.

A pliable or resilient, elongatable valve housing 17 is generally formed of a fluid resistant elastomer, e.g. neoprene, and is insertable in the opening 16. The valve housing 17 comprises a plug portion 18, and an elongatable portion 19. An annular locking recess 20 is provided between the plug portion 18 and the elongatable portion 19. The plug portion 18 fits into the recess 15 and the portion 19 extends into the storage vessel 14 when the valve housing 17 is inserted in the closure cap opening 16. The plug portion 18 compressively engages the wall of the recess 15 and provides a seal between the valve housing 17 and the closure cap 12. An annular inwardly directed flange 21 formed in the well 15 and surrounding the opening 16, extends into the annular locking recess 20, and holds the valve housing 17 firmly to the closure cap 12, and provides another seal between the valve housing 17 and the closure cap 12.

A chamber or cavity 22 is formed in the resilient valve housing 17. The housing extremity 23 extending into the storage vessel 14, is solid and serves as a valve stem abutment 24. The housing end 25 extending from the storage vessel 14, is provided with a passenger or opening 26 leading from the chamber 22. The housing wall 27 adjacent the extremity 23, is relatively thin and stretchable compared to the wall 28 of the plug portion 18.

An annular shoulder 29 is formed in the chamber 22, preferably, adjacent the recess 20, and serves as a first valve seat. The shoulder or valve seat 29 is, preferably, sloped in a direction in which material under pressure moves through the chamber 22 so as not to impede the flow through the chamber 22. The sloped surface also aids in removal of the cavity forming core after the molding of housing 17.

A second annular valve seat 30 is disposed in the chamber opening 26. The valve seat 30, preferably, has a conical surface 31 sloped in the direction in which fluid under pressure moves from the fluid chamber 22. The surface 31 may have a spherical or other configuration, if desired, so long as effective seating is obtained.

A rigid valve stem 32 is mounted in the chamber 22 of the valve housing 17. The stem 32 carries a valve 33 which is biased against the valve seat 30 to close or seal the chamber opening 26, and keep material from flowing out of the chamber 22 and storage vessel 14. The valve 33, preferably, has a complementarily shaped surface 34 for matingly engaging the surface 31 of the valve seat 30. The valve 33 also has a sloped, configured surface 35 for not impeding the flow around the valve 33. The valve stem 32 also carries a second valve 36 for simultaneously engaging the shoulder or seat 29 formed in the chamber 22. Valve 36 also has a flat surface 37 and a 90° edge for line contact and for sealingly engaging the annular surface 29 against which it is biased by resilient housing 17. The valve 36 is also configured on its high pressure side as frusto-conical surface 38 so as not to impede the flow.

The valve stem 32 has an enlarged end 39 which rests against the abutment 24 formed in the solid housing end 23 when the valves 33 and 36 are seated or in sealing engagement with the valve seats 30 and 29, respectively. The valve stem 32 is depressed towards the container bottom 40 to unseat simultaneously the valves 33 and 36. In doing this, the relatively thin resilient chamber wall 27 elongates. When the force for depressing the valve stem 32 is removed, the resiliency of the chamber wall 27 moves the valves 33 and 36 back into seating relation with the valve seats 30 and 29, respectively.

A plurality of openings 41 and 42 may be provided in the flexible wall 27 of the chamber 22 although one such opening will suffice. The openings 41 and 42 are open to the storage vessel 14, and allow material under pressure to move into the chamber 22.

A nozzle assembly, generally indicated at 43, is provided for depressing the valve stem 32 and carrying material under pressure from the chamber 22 and storage vessel 14 to the exterior of the container 9. The nozzle assembly 43 comprises a fixed lid or cap portion 44 which is desirably removably locked or fastened to the container end 11, and an actuator head 45 which is slidably mounted on the lid portion 44 and used to actuate, or depress the valve stem 32. The lid and actuator portions are preferably made of plastic, e.g. polyethylene or polypropylene.

In the embodiments shown in FIGS. 1 and 4 the lid portion 44 has a generally bell-shaped configuration with a projecting portion 46, and a skirt portion 47 which is provided with an inner rim 48 of smaller diameter than the chime 13 to provide a removable snap interlock for the lid portion 44 onto the container 9. There is also provided in these embodiments an inner skirt 46a which coacts with the closure cap 12 and with the rim 48—chime 13 interlock to limit axial movement of the nozzle assembly. However, the configuration of the nozzle assembly and the means of attaching it to the container are dependent upon the structure and size of the metallic portion of the container. Portion 46 has a sloped upper extremity 49. A pair of annular recesses or wells 50 and 51 of different diameters, extend from the lid extremity 49 into the lid portion 44. An annular abutment 52 is formed between the differentially sized recesses 50 and 51. The recesses 50 and 51 are preferably concentrically formed about an axis which coincides with the longitudinal axis of the valve stem 32. The lid portion 44 also includes a projecting dormer portion 53 having an enlarged opening 54 to accommodate axial movement of a spout portion 55 as the actuator head 45 is moved to control the release of material from the vessel.

The actuator head 45 comprises a pair of stepped annular portions 56 and 57 of increasing diameter and which are slidable in the annular recesses 50 and 51. The extremity 58 of the annular portion 56 is sloped to match the sloped extremity 49 of the lid portion 44. This makes the actuator portion 45 more readily accessible and easier to manipulate or depress by finger pressure.

Figure 5:
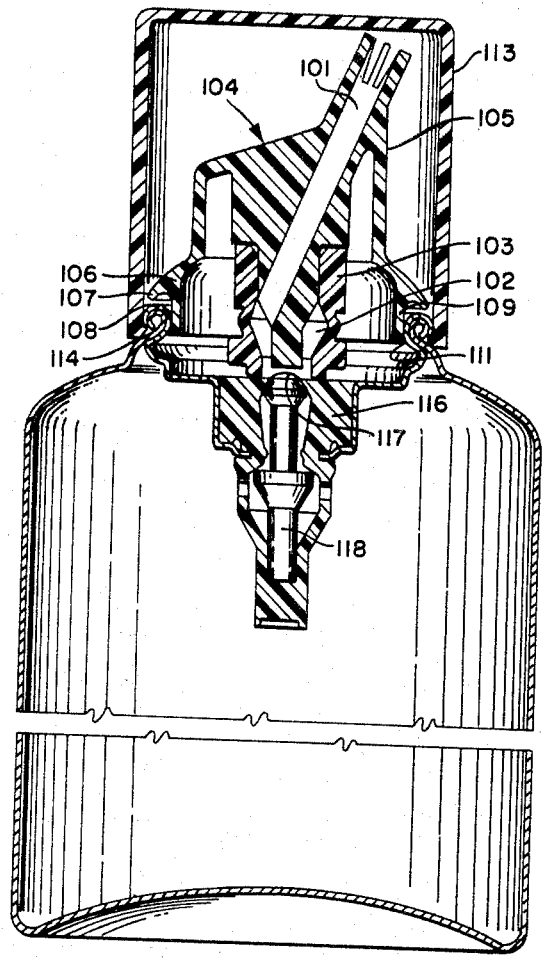
FIG. 5 is a cross-sectional view of another embodiment of the invention showing a different nozzle assembly.

An annular flange or shoulder 59 is formed between the annular portions 56 and 57, and abuts the annular abutment 52 to limit movement of the actuator portion 45 away from the valve stem 32. The annular portions 56 and 57 are, preferably, hollow, the actuator portion extremity 58 being a finger actuatable disc 60. A solid core 61, concentrically formed with the annular portion 56 and 57, extends from the disc 60 towards the valve stem 32. The laterally extending spout portion 55 projects from the core 61 into the enlarged opening 54 in the lid's dormer portion 53, and includes a substantially L-shaped nozzle fluid passageway 62 formed in the core portion 61 and laterally projecting spout portion 55 of the actuator 45. As shown in FIG. 5 this may be a straight through opening to facilitate cleaning.

A selected one of a plurality of nozzle inserts 63 can be inserted in the open end 64 of the fluid passageway. The inserts 63 have differently configured openings 65 (FIG. 3). The embodiment of the invention illustrated in FIG. 1 is particularly well suited for dispensing semi-solids, e.g. cream cheeses or whipped cream, and many different decorative effects can be achieved by providing inserts with differently configured nozzle openings 65.

The actuator core 61 comprises a generally cylindrical core portion 66 extending from a main core portion 67 of greater diameter. An annular shoulder or abutment 68 is formed between the core portions 66 and 67. The core portion or tip 69 which engages and depresses the valve stem 32, preferably, has a smaller diameter than the fluid chamber opening 26 formed in the valve seat 30. Thus, when the core portion 69 is depressed to unseat the valve 33, it will not engage and damage the valve seat 30, to impair the seal between the valve 33 and valve seat 30.

A hollow resilient housing or sleeve 71 surrounds the valve stem engaging core portion 66, and sealingly abuts the core shoulder 68 and the exterior of valve housing 17 around the periphery of opening 26. The sleeve 71 engages the plug portion 18 spaced from the valve seat 30 to prevent any distortion of the valve seat 30 by the sleeve 71 as it is compressed by the actuator mechanism 45.

The pliable or resilient sleeve 71 has a flexible wall portion 72 intermediate the sleeve's comparatively firm end portions 73 and 74, which engage the valve housing 17 and core shoulder 68, respectively. The flexible wall 71 acts to bias the actuator 45 away from the valve stem 32 in one direction, and collapses to permit contact of actuator tip 69 with valve stem 32 while maintaining a seal between the plug 17 and the sleeve 71.

A cavity or chamber 75 is formed between the valve stem engaging portion 69 and the resilient sleeve 71. The end 76 of the nozzle's passageway 62, communicates with the sleeve chamber 75. The chamber 75 also communicates with the chamber 22 of the valve housing 17 when the valve stem 32 is depressed and the valves 33 and 36 are unseated.

Thus, the resilient sleeve 71 is utilized for directing material from the chamber 22 into the nozzle passageway 62, and for biasing the actuator 45 away from the valve stem 32. In depressing the valve stem 32, the actuator 45 by means of shoulder 68 compressively collapses the sleeve 71 at the resiilent portion 72 and through coaction with valve stem 32 effects elongation of the valve housing 17. Movement of the actuator 45 is desirably limited such as shown in FIG. 1, to reciprocating between a pair of fixed stops, e.g. abutment 52 and the base of movable actuator head 45 abuttingly coacting with can top 12.

The embodiment of the pressurized container 9 illustrated in FIG. 1 must be tilted, or inverted when dispensing semi-solids.

The pressurized container 9 illustrated in FIG. 4 is particularly well suited for dispensing liquids, e.g. salad oils and the like, in spray form. When dispensing liquids fluid passageway 62 is not of as large a diameter as the nozzle fluid passageway 62 (FIG. 1) which is better adapted to handling semi-solid materials like cream cheese. The smaller passageway improves the dispensing of liquids. The embodiment illustrated in FIG. 4 can also be provided with a selected insert 78 from a plurality of inserts having differently sized or differently configured restricted openings 79. Also, the solid valve housing end 23 is provided with a tube receiving opening or passageway 80 extending through the fluid chamber abutment 24, and into the fluid chamber 22, resulting in an annular abutment 24a being formed around the tube receiving opening 80.

A fluid passageway 81 is formed in the enlarged end 39 of the valve stem 32. The fluid passageway 81 adjacent the valve stem extremity 82, is enlarged forming a tube receiving recess or opening 83. A piece of tubing 84 extending to a point adjacent the container bottom 40, is inserted through the housing passageway 80 and into the stem receiving recess 83 where it is frictionally held.

A fluid outlet port 85 is provided and communicates with the fluid passageway 81 and the fluid chamber 22 formed in the resilient valve housing 17. A vapor tap 86 is also provided in the wall 27 of the fluid chamber 22 and communicates with the storage vesel 14. The embodiment of the invention illustrated in FIG. 4 is normally used in a substantially upright position, that is, the container 9 is not inverted. The liquid in the storage vessel 14 is under gas pressure such as provided by a normally gaseous liquid propellant. When the actuator 45 is depressed, valves 33 and 36 are simultaneously unseated, and gas under pressure exits from the storage tank 14 through the restricted passageway or "vapor tap" 86 into the housing chamber 22, and out through the nozzle passageway 62. With the container in dispensing position the gas under pressure as it passes through the restricted opening 87 defined by the shoulder 29, mixes with liquid from the fluid chamber 22 forced there by the gas pressure above the liquid in the storage vessel 14. The liquid is atomized by the exiting gas, and leaves the nozzle insert opening 79 in a finely divided spray or mist.

The pressurized containers illustrated in FIGS. 1, 4, 6 and 7 include means for relieving excess pressure in the storage vessel 14 as more particularly pointed out in application Ser. No. 412,914, filed Nov. 23, 1964. A plurality of openings or apertures 90 are provided in the annular flange 21 surrounding the well opening 16. The apertures 90 communicate with the storage vessel 14 and an annular recess 91 formed between the well 15 and the plug portion 18 of the valve housing 17. Excess pressure in the storage vessel 14 forces gas through apertures 90 into the annular relief recess 91. The gas is then forced from the annular recess 91 out into the space 92 between the cap and the top of the container between the compressively engaged surfaces of the plug portion 18 and the well 15. Since the nozzle 43 is not airtight, the excess gas escapes to the atmosphere. It is readily seen that the extent of surface contact between the plug portion 18 and the walls of the well 15 can serve as a means for regulating the amount of pressure in the container 9. In other words, the depth of the well 15 can be varied with the pressure requirements of the contents of the container 9, i.e. containers having relatively greater pressures are provided with deeper wells.

FIG. 5 shows an embodiment of this invention wherein the nozzle portion is provided with a straight-through passageway 101 communicating with cavity or chamber 102 in resilient sleeve 103. This construction facilitates cleaning of residual material from the passageway 101 with any suitable means, e.g. a tube brush or a stream of water. In this embodiment, the nozzle assembly 104 is comprised of an actuator head 105 which is integral with a lid portion 106. Lid portion 106 is provided with a projecting lip 107 adjacent its base which abuttingly coacts with rolled rim 108 of the container to limit downward movement of the actuator head 105. Depending skirt 109 of smaller diameter than lip 107 slidingly coacts with the innermost surface of rolled rim 108, and is provided with an annular flared portion 111 of slightly larger diameter than skirt 109, which is also slightly larger than the internal diameter of rolled rim 108. This provides a means for removably frictionally retaining the nozzle assembly 104 to the container, which permits the requisite axial movement of actuator head 105 to dispense material from the container. An easily removable cap 113 is also provided and is removably secured by an inner annular flange 114 coacting with the outer surface of rim 108.

The nozzle assembly 104 is easily removed due to the resiliency of the plastic, e.g. polyethylene, from which the parts are conveniently formed. When so removed, there is presented, as in the cases of FIGS. 1 and 4, a substantially smooth surface defined by the flat outer surface of the plug portion 116 and the top 117 of valve stem 118. Such a surface allows for easy cleaning of the exterior of the container and minimizes the places where perishable food material may accumulate and spoil. The design and structure of the nozzle assembly 104 also facilitates cleaning such that the entire package is especially useful in the dispensing of perishable foods.

Figure 6:
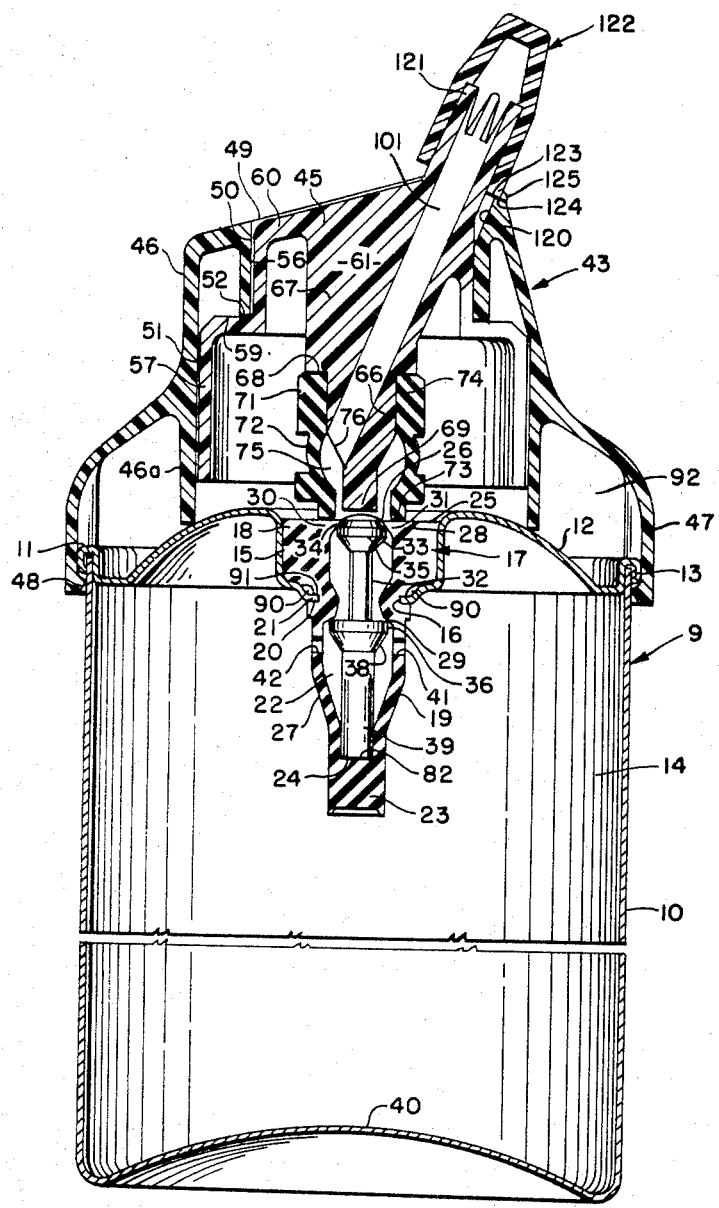
FIG. 6 is a cross-sectional view of still another embodiment of the invention.

Referring to FIG. 6, there is shown an embodiment of the invention which incorporates the straight-through nozzle passageway 101 illustrated in FIG. 5 in the nozzle assembly 43 illustrated in FIG. 1. The use of the straight-through passageway 101 in the nozzle assembly 43 obviates the need for the dormer portion 53. A portion 120 of lid portion 44 is removed and configured to accommodate reciprocating movement of projecting nozzle potrion 121.

It is beneficial to provide some means for keeping the nozzle assembly 43 from being accidently triggered when the pressurized dispenser is on display. Many dispensers employ a removable cap such as cap 113 (FIG. 5) for covering the nozzle asembly 43 to keep people from the valve actuator 45, whereby material can be accidently discharged from the container. The embodiment illustrated in FIG. 6 is particularly well suited for receiving a tamperproof device generally indicated at 122. The device 122 is in the form of a cap which is frictionally secured on the projecting nozzle portion 121 for restricting movement of the nozzle portion relative to the lid portion 44. The cap 122 also seals the nozzle passageway 101. When the cap 122 is positioned on the nozzle portion 121, the marginal edge 123 of the cap 122 abuts a stop portion 124 formed in the lid portion 44 adjacent the projecting nozzle portion 121. A temporary seal 125 in the form of wax or any other suitable sealing material can be provided to keep the cap 122 in abutting relation with the lid stop 124. The seal is such that upon purchasing the dispenser, it can be easily broken in order to remove the cap 122.

It should be noted that the cap 122 can be threadably engaged on the projecting nozzle portion 121. Such a coupling is not necessary because of the arrangement of parts. For example, the longitudinal axis of the passageway 101 and cap 122 are angularly disposed to the longitudinal axis of the actuator head 45 and valve stem 32, or the axis along which the actuator head 45 and valve stem 32 reciprocate. As seen from the drawing, any force applied to the actuator head 45 causes the head to move along its longitudinal axis. When such force is applied, the projecting nozzle portion 121 will either bind with the cap 122, or the nozzle portion 121 as it moves from the cap 122 along the angularly disposed axis of the passageway 101 will cause the actuator head 45 to bind with the lid portion 44, i.e. within the guide recesses 50 and 51. Because of this unique coaction between the parts of the nozzle assembly 43, it is sufficient that the cap 122 frictionally engage the nozzle portion 121. This principle, by comparison, becomes more evident if the projecting nozzle portion 121 and cap 122 were positioned for movement parallel to the aixs along which the actuator head 45 moves. In such a case there would be no binding of the projecting nozzle portion 121 or actuator head 45, and friction alone would normally not be sufficient to restrain movement of the actuator head 45. It would then be well top rovide a positive interlock between the parts, such as threadably engaging the cap 122 on the projecting nozzle portion 121.

The tamperproof device is removably coupled directly to the combination actuator head and nozzle for restricting its movement. The device 122 does not cover the actuator head and nozzle as do other tamperproof devices. Further, the device 122 seals the nozzle passageway 101 and keeps dust, etc., from entering the passageway 101 and contaminating material dispensed from the container.

Figure 7:
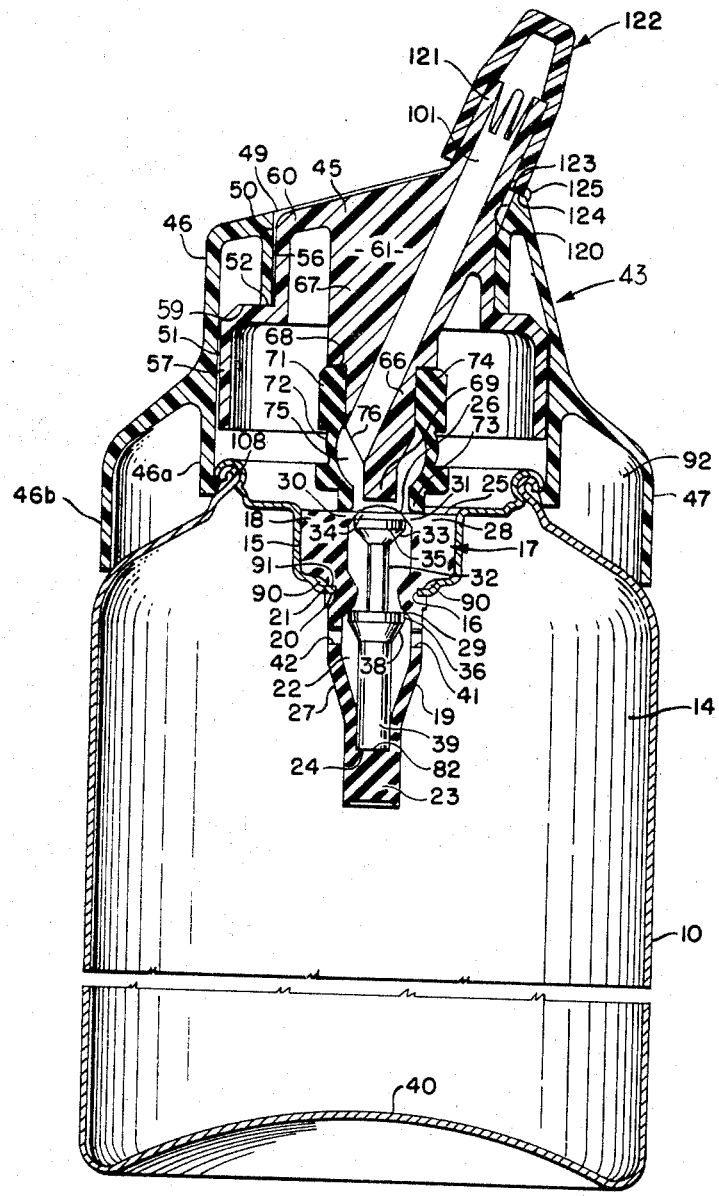
FIG. 7 is a cross-sectional view of still another embodiment of the invention.

Referring more particularly to FIG. 7, there is shown an embodiment of the invention which has all the essential features of the embodiment illustrated in FIG. 6. The difference in the two structures is in the manner of mounting the lid portion 44 on the dispenser or container body. The lid portion 44 of FIG. 6 is designed for mounting on the type of dispenser body illustrated in FIG. 1, and the lid portion 44 illustrated in FIG. 7 is designed for mounting on the type of dispenser body illustrated in FIG. 5. The inner skirt 46a (FIG. 7) interlockingly coacts with the rolled rim 108. The outer skirt portion 46b of the lid portion 44 engages the container top in a manner similar to that which the inner skirt 46a engages the closure cap 12 in FIG. 1. In other words, the outer skirt 46a stabilizes the lid portion 44 on the dispenser, and keeps the lid portion from moving towards the bottom of the dispenser body.

Thus, there has been provided a new and novel valve mechanism for dispensing materials, in particular semisolids, and liquids in spray or mist form, from a pressurized container.

It is, therefore, particularly pointed out and distinctly claimed as the invention:

1. In combination:
   (a) a container for holding dispensable material under pressure, said container being provided with an opening;
   (b) a resilient valve housing disposed in said opening of the container, said valve housing having a chamber therein with a valve opening to the exterior and an inlet communicating with the interior of said container respectively;
   (c) a first valve seat disposed within the valve housing adjacent the valve opening;
   (d) an externally accessible depressable valve stem mounted in the valve chamber;
   (e) a valve carried by the valve stem normally biased into sealing engagement with the valve seat;
   (f) a hollow nozzle mounted on the container for dispensing material, said nozzle having an opening therethrough in adjacent spaced relationship from the valve opening, said nozzle including means for actuating the valve stem to unseat the valve; and
   (g) an integral resilient hollow sleeve interposed the nozzle and the valve housing and separable from said valve housing for directing material from the container via the valve chamber into the nozzle in response to unseating of said valve, wherein said hollow sleeve is in sealing engagement with said resilient valve housing and provides an enlarged volume for directing said material into said nozzle.

2. The combination of claim 1 further comprising means removably coupled to the nozzle for keeping the valve stem depressing means from engaging the valve stem to preclude unseating of the valve whereby material under pressure is inadvertently dispersed from the container.

3. The combination of claim 1, which includes an insert having a predetermined configured opening for coaction with the nozzle to ornamentally shape material dispensed from the container.

4. The combination of claim 1 wherein the valve actuating means is integral with the nozzle and extends through said sleeve.

5. The combination of claim 1 wherein the internal diameter of the sleeve is greater than the diameter of the aperture of said valve seat.

6. The combination of claim 1 wherein the resilient sleeve extends beyond the valve actuating means and intercepts the flat surface surrounding said valve opening and said valve actuating means is biased out of contact with said valve stem.

7. In combination, a valve structure for a pressurized container, a nozzle, and communication means coacting between the valve structure and the nozzle, said valve structure including:
   (a) a resilient valve housing disposed in an opening in the container;
   (b) a chamber in said housing and having a valved outlet and an unvalved inlet in communication with the exterior and interior of said container, respectively said outlet being in spaced relation from said nozzle during operation of said nozzle;
   (c) a valve seat formed in the valved outlet;
   (d) an externally accessible valve stem disposed in said valved outlet for axial reciprocal movement therein;
   (e) a valve on said valve stem and held in biased sealing engagement with said valve seat;
   (f) means coacting between the nozzle and valve stem for actuating the valve in response to movement of the nozzle, and said communication means including:
   (g) a hollow resilient sleeve means mounted between the valve housing and nozzle, said sleeve means being independent from said valve housing and in sealed relation with the valved outlet and nozzle to define a sealed chamber therebetween said sealed chamber directing material emanating from the housing chamber into said nozzle.

8. The combination of claim 7 in which the resilient housing includes a second valve seat, and the valve stem includes a second valve mounted for coaction with said second valve seat simultaneously with the coaction of the valve with said outlet valve seat.

9. The combination of claim 8 wherein the inlet to said housing chamber is disposed on the high pressure side of said second valve seat.

10. The combination of claim 9 wherein the housing chamber is provided with second inlet means including an elongated tubular fluid conduit for disposition adjacent the bottom of said container.

11. In combination:
   (a) a container for holding dispensable material under pressure, and provided with an opening;
   (b) a resilient valve housing insertable in the opening for sealing the container, said housing having a chamber with a valve opening leading therefrom, and an open port communicating directly with the interior of said container;
   (c) a valve seat disposed in the valve opening in said chamber;
   (d) an externally accessible depressable valve stem mounted in the valve housing;
   (e) a valve carried by the valve stem and biased by said resilient housing into sealing engagement with the valve seat;
   (f) a nozzle for carrying fluid away from the fluid chamber said nozzle being mounted on the container and including means for depressing the valve stem to unseat the valve;
   (g) a resilient sleeve coacting between the nozzle and valve housing for directing material from the chamber into the nozzle said sleeve being independent from said valve housing; and
   (h) means removably coupled to the nozzle for keeping the valve stem depressing means from engaging the valve stem whereby the valve is unseated and material under pressure dispensed from the container.

12. The combination of claim 11, wherein the means (h) for keeping the valve stem depressing means from engaging the valve stem also seals the nozzle.

13. The combination of claim 12 wherein the nozzle includes a fixed lid portion mounted on the container and the means for depressing the valve stem include an actuator head mounted for movement relative to the lid portion, and a nozzle portion projecting from the actuator head and including a fluid passageway, and the means (h) for sealing the nozzle and keeping the valve stem depressing means from engaging the valve stem includes a cap frictionally engaged on the projecting nozzle portion in abutting relation to the lid portion for keeping the actuator head from moving towards the valve stem.

14. The combination of claim 13 wherein the longitudinal axis of the projecting nozzle portion and cap are angularly disposed to the axis along which the actuator head moves towards the valve stem, such that any movement of the projecting nozzle portion relative to the cap causes binding of the actuator head with the lid portion, thereby restricting movement of the actuator head towards the valve stem.

References Cited

UNITED STATES PATENTS

| | | | |
|---|---|---|---|
| 1,878,929 | 9/1932 | Kuenzli et al. | 251—335.2 X |
| 2,499,149 | 2/1950 | Lippold | 251—354 X |
| 2,982,448 | 5/1961 | Leonard et al. | 222—153 |
| 3,195,819 | 7/1965 | Watanabe | 239—601 |
| 3,283,963 | 11/1966 | Boyer et al. | 222—402.24 |

ROBERT B. REEVES, *Primary Examiner.*

N. L. STACK, *Assistant Examiner.*

U.S. Cl. X.R.

222—402.12, 402.24, 518, 565; 239—601; 251—354